(12) United States Patent
Gollier

(10) Patent No.: US 10,670,861 B2
(45) Date of Patent: Jun. 2, 2020

(54) OPTICAL ASSEMBLY WITH WAVEPLATE CONFIGURATION FOR GHOST IMAGE REDUCTION

(71) Applicant: Facebook Technologies, LLC, Menlo Park, CA (US)

(72) Inventor: Jacques Gollier, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/158,773

(22) Filed: Oct. 12, 2018

(65) Prior Publication Data

US 2019/0369390 A1 Dec. 5, 2019

Related U.S. Application Data

(60) Provisional application No. 62/680,235, filed on Jun. 4, 2018.

(51) Int. Cl.
  *G02B 27/00* (2006.01)
  *G02B 7/02* (2006.01)
  *G02B 5/30* (2006.01)
  *G02B 27/01* (2006.01)

(52) U.S. Cl.
  CPC ....... *G02B 27/0018* (2013.01); *G02B 5/3025* (2013.01); *G02B 7/021* (2013.01); *G02B 27/0172* (2013.01)

(58) Field of Classification Search
  CPC .. G02B 7/021; G02B 5/3025; G02B 27/0172; G02B 17/0856; G02F 1/133536; G02F 2001/133607
  See application file for complete search history.

(56) References Cited

U.S. PATENT DOCUMENTS

| 2002/0015116 | A1* | 2/2002 | Park ................... G02B 27/0172 349/9 |
| 2007/0153162 | A1 | 7/2007 | Wright |
| 2016/0377871 | A1* | 12/2016 | Kress ................. G02B 27/0172 359/567 |
| 2017/0068096 | A1 | 3/2017 | Ouderkirk et al. |
| 2017/0227777 | A1 | 8/2017 | Carollo et al. |
| 2017/0255015 | A1 | 9/2017 | Geng et al. |
| 2018/0101020 | A1 | 4/2018 | Gollier et al. |
| 2018/0120579 | A1 | 5/2018 | Gollier et al. |

OTHER PUBLICATIONS

"International Search Report and Written Opinion Issued in PCT Application No. PCT/US2018/055819", dated Feb. 28, 2019, 16 Pages.

* cited by examiner

*Primary Examiner* — Abbas I Abdulselam
(74) *Attorney, Agent, or Firm* — Freestone Intellectual Property Law PLLC; Aaron J. Visbeek

(57) ABSTRACT

A lens assembly includes a first optical element and a second optical element. The first optical element includes a partially reflective layer and a waveplate. The second optical element includes a reflective polarizer configured to reflect a first polarization orientation of display light back to the first optical element and transmit a second polarization orientation of the display light.

20 Claims, 4 Drawing Sheets

OPTICAL ASSEMBLY WITH WAVEPLATE CONFIGURATION FOR GHOST IMAGE REDUCTION

CROSS REFERENCE TO RELATED APPLICATIONS

This application claims priority to U.S. provisional Application No. 62/680,235 filed Jun. 4, 2018, entitled "OPTICAL ASSEMBLY WITH WAVEPLATE CONFIGURATION FOR GHOST IMAGE REDUCTION," which is hereby incorporated by reference.

TECHNICAL FIELD

This disclosure relates generally to optics, and in particular to optical assemblies for reducing ghost images

BACKGROUND INFORMATION

An optical assembly can be included in a head mounted display (HMD) in order to focus image light emitted from a display to an eye of a user that wears the HMD. However, layers of the optical assembly may generate Fresnel reflections. A portion of the Fresnel reflection may become incident on the eye of a user and noticeable to the user as ghost images. Ghost images may be distracting and otherwise bothersome to a user of an HMD.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an optical assembly are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The optical assemblies that are described in this disclosure utilize a waveplate configuration that may reduce ghost images presented to an eye of a user of an HMD. An example lens assembly includes a first optical element and a second optical element. The first optical element receives display light from a display. The first optical element includes a partially reflective layer and a waveplate such as a quarter waveplate. Prior lens assemblies included a waveplate in a second optical element of a lens assembly that was positioned closer to the eye of a user than the first optical element. However, including the waveplate in the first optical element in accordance with embodiments of the disclosure may reduce the number of times that display light encounters reflective surfaces. Consequently, a magnitude of ghost images may be reduced because the display light encounters fewer reflective surfaces and associated Fresnel reflections. These and other embodiments are described in more detail associated with FIGS. 1-4.

Figure 1:
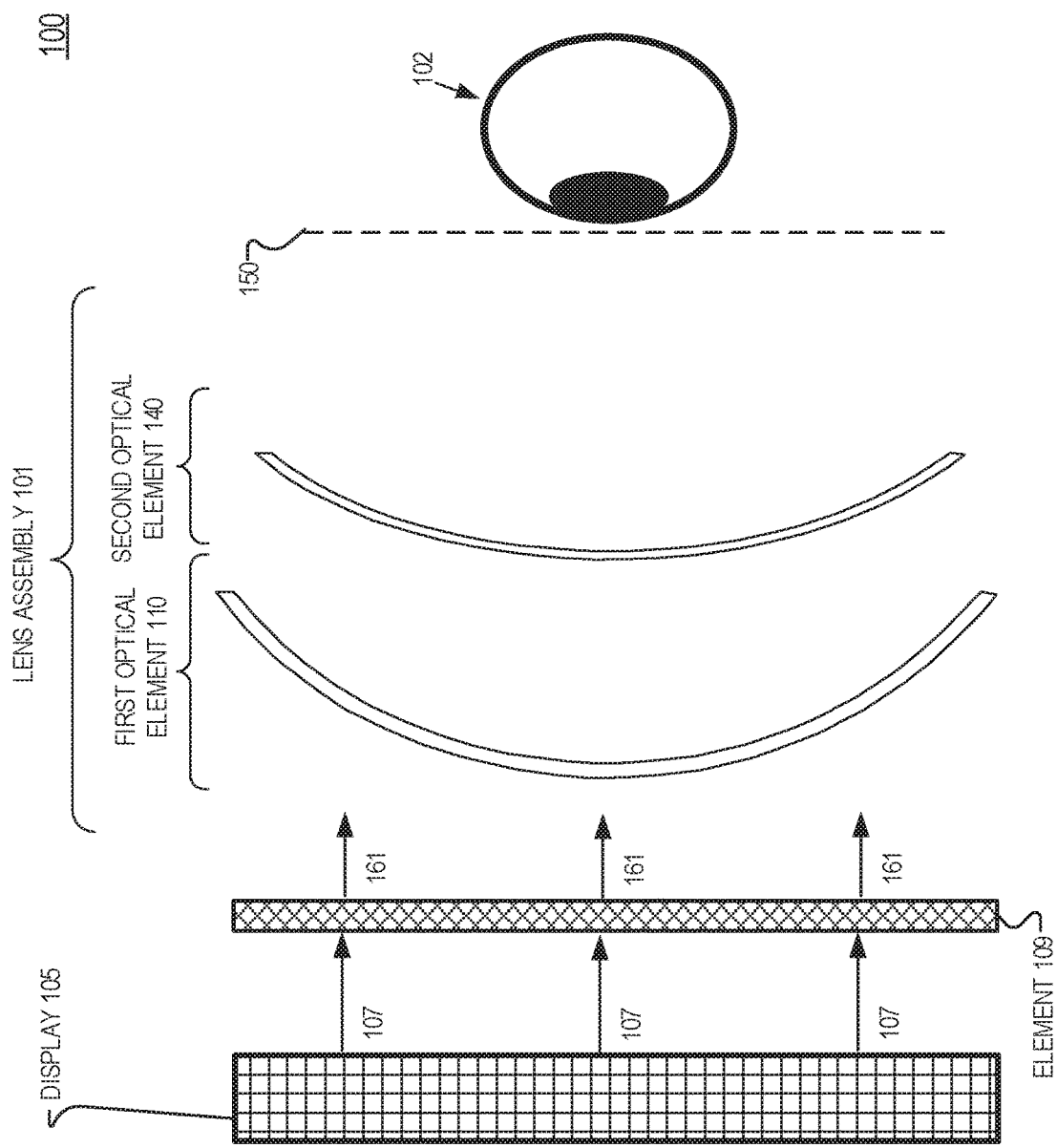
FIG. 1 illustrates an example optical system that includes a display and a lens assembly including a first optical element and a second optical element, in accordance with an embodiment of the disclosure.

FIG. 1 illustrates an example optical system 100 that includes a display 105 and a lens assembly 101 including a first optical element 110 and a second optical element 140, in accordance with an embodiment of the disclosure. Optical system 100 may be utilized in an HMD. FIG. 1 includes an optional optical element 109 disposed between the first optical element 110 and display 105. Lens assembly 101 is configured to focus display light 107 to an eyebox area 150 for an eye 102 of a user wearing an HMD. Display 105 may include a liquid crystal display (LCD), an organic light emitting diode (OLED) display, micro-LED display, quantum dot display, pico-projector, or liquid crystal on silicon (LCOS) display.

In operation, display 105 emits display light 107. When display light 107 is linearly polarized, element 109 includes a waveplate that generates circularly polarized light 161. If display 105 emits unpolarized light as display light 107, element 109 may be a circular polarizer that includes a linear polarizer and a quarter waveplate to generate circularly polarized light 161. Lens assembly 101 receives circularly polarized light 161 and focuses it for eye 102 to view images.

Figure 2:
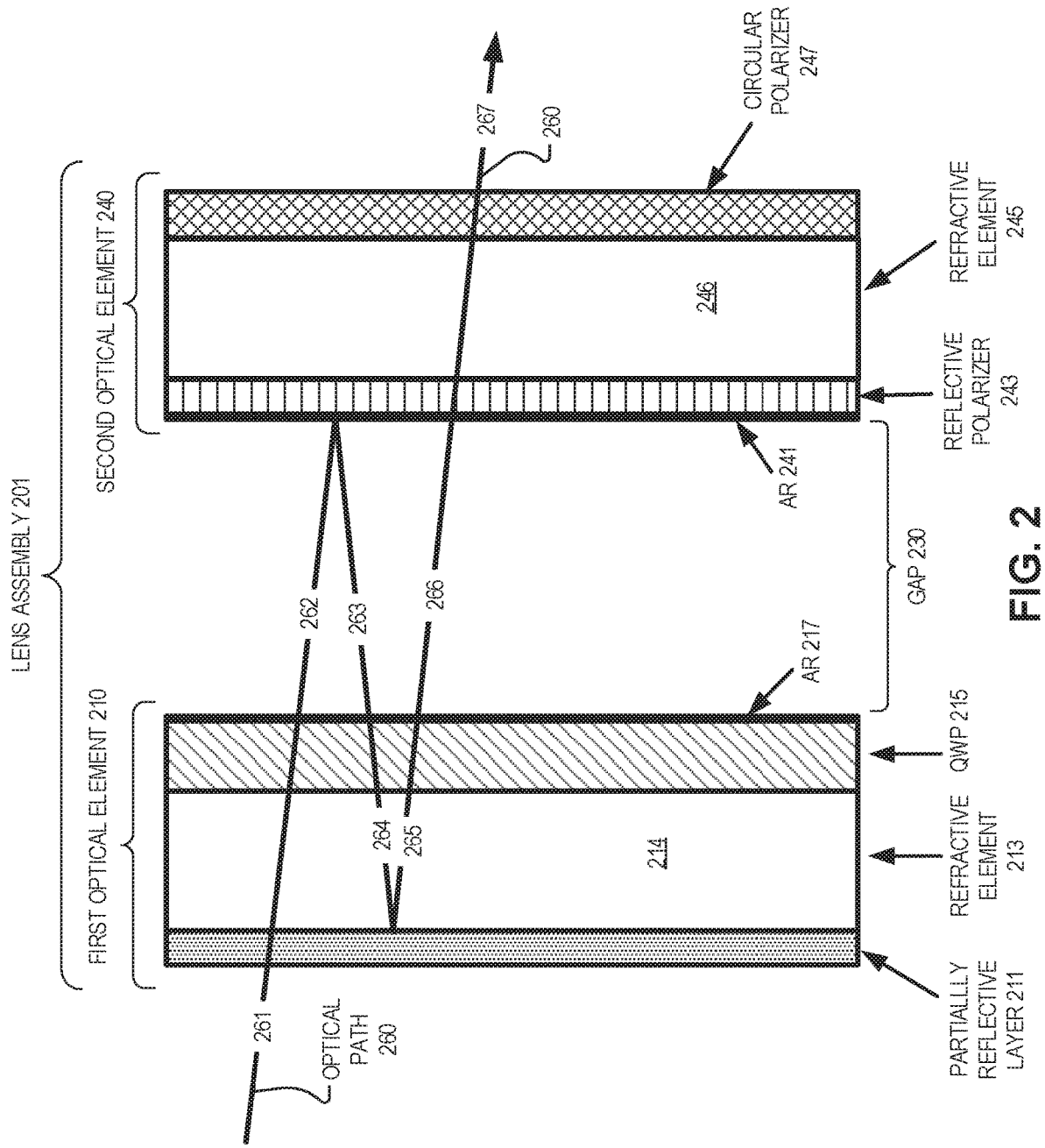
FIG. 2 illustrates an example lens assembly including a first optical element having a waveplate and a second optical element, in accordance with an embodiment of the disclosure.

FIG. 2 illustrates an example lens assembly 201 including a first optical element 210 having a waveplate 215 and a second optical element 240, in accordance with an embodiment of the disclosure. Lens assembly 201 is one example configuration that may be used as lens assembly 101, in FIG. 1.

In FIG. 2, gap distance 230 separates first optical element 210 from second optical element 240. First optical element 210 includes a partially reflective layer 211, a refractive element 213, a quarter waveplate (QWP) 215, and an anti-reflection (AR) layer. In the illustrated embodiment, partially reflective layer 211 is disposed on refractive element 213 and QWP 215 is disposed an opposite side of refractive element 213 from the partially reflective layer 211. QWP 215 may be laminated to refractive element 213 with an index matching bonding material, in some embodiments.

In some embodiments, a waveplate imparting a retardance other than a quarter wave may be used in place of QWP 215. In one embodiment, partially reflective layer 211 is a mirrored surface configured to transmit approximately 50% of incident light and reflect approximately 50% of incident light. Refractive element 213 may be made of refractive material 214. Refractive material 214 may include, plastic, glass, poly-methyl methacrylate (PMMA), or other acrylic. In some embodiments (not illustrated in FIG. 2), refractive element 213 includes a lensing curvature having optical power.

QWP 215 is configured to shift the polarization axis of incident light by π/4 (45 degrees). Therefore, incident linearly polarized light may be converted to circularly polarized light by QWP 215. Likewise, incident circularly polarized light may be converted to linearly polarized light by QWP 215. QWP 215 may be made of birefringent materials such as quartz, organic material sheets, or liquid crystal, for example. In one embodiment, QWP 215 is designed to be a so called "zero order waveplate" so that the retardance imparted by the QWP 215 remains close to a quarter of a wave independent of the wavelength and angle of incidence of incoming light. AR layer 217 is configured to reduce reflection of incident light. AR layer 217 may be a single layer, in some embodiments. AR layer 217 may include multiple layers having different refractive indexes, in some embodiments.

In the illustrated embodiment of FIG. 2, second optical element 240 includes an AR layer 241, a reflective polarizer 243, a refractive element 245, and a circular polarizer 247. AR layer 241 may be configured similarly to AR layer 217. Reflective polarizer 243 is configured to reflect a first polarization orientation of light (e.g. p-polarized light) and transmit a second polarization orientation of the light (e.g. s-polarized light). The first polarization orientation may be linearly polarized light that is orthogonal to the second polarization orientation, for example. Refractive element 245 includes a refractive material 246 that may have characteristics similar to refractive material 214. In the illustrated embodiment, circular polarizer 247 is coupled to refractive element 245. In some embodiments, circular polarizer 247 is not coupled to refractive optical element 245 and is not part of second optical element 240. Circular polarizer 247 is configured to generate circularly polarized light from incident linearly polarized light. Circular polarizer 247 may include a linear polarizer stacked next to a quarter waveplate.

Display light optical path 260 in FIG. 2 includes circularly polarized display light 261 encountering partially reflective layer 211. A portion (not illustrated) of the circularly polarized display light 261 is reflected by partially reflective layer 211. The remaining (not reflected) portion of display light 261 is transmitted by partially reflective layer 211 and refractive element 213 and then encounters QWP 215. QWP 215 rotates the circularly polarized display light 261 to generate linearly polarized display light 262 that passes through AR layer 217 before encountering reflective polarizer 243. Linearly polarized display light 262 may be p-polarized light and reflective polarizer 243 may be configured to reflect p-polarized light and transmit s-polarized light, for example.

Linearly polarized display light 262 is reflected by reflective polarizer 243 as reflected linearly polarized light 263. Linearly polarized light 263 transmits through AR layer 217 and is rotated 45 degrees by QWP 215 to generate circularly polarized light 264. A portion (not illustrated) of circularly polarized light 264 is transmitted by partially reflective layer 211. The remaining portion of circularly polarized light 264 (not transmitted through layer 211) is reflected as circularly polarized light 265. Circularly polarized light 265 is rotated 45 degrees by QWP 215 to generate orthogonal linearly polarized light 266. Orthogonal linearly polarized light 266 has an orientation that is orthogonal to linearly polarized light 262. Consequently, orthogonal linearly polarized light 266 is transmitted (passed) by reflective polarizer 243 rather than reflected. Orthogonal linearly polarized light 266 propagates through AR layer 241, reflective polarizer 243, and refractive element 245 before exiting second optical element 240 as circularly polarized light 267. A linear polarizer included in circular polarizer 247 may be configured to pass linearly polarized light that is aligned with light 266 while a quarter waveplate included in circular polarizer 247 shifts orthogonal linearly polarized light 266 to circularly polarized light 267.

Circularly polarized light 261 in FIG. 2 is an example of display light that may be received by lens assembly 201 for providing images to a wearer of an HMD. Notably, in the embodiment illustrated in FIG. 2, optical path 260 for display light encounters only four prominent ghost reflection sites where Fresnel reflections that cause ghost images may occur.

A first ghost image may be generated from a Fresnel reflection at AR layer 217 where the first ghost image propagates along an optical path (starting as light 261) encountering layer 211, QWP 215, AR 217 (reflecting), QWP 215, layer 211 (reflecting), QWP 215, and transmitting through polarizer 243 toward an eyebox area.

A second ghost image may be generated from a Fresnel reflection at AR layer 217 where the second ghost image propagates along an optical path (starting as light 261) encountering layer 211, QWP 215, AR 217, polarizer 243 (reflecting), AR 217 (reflecting), polarizer 243 (reflecting), QWP 215, layer 211 (reflecting), QWP 215, and transmitting through polarizer 243 toward an eyebox area.

A third ghost image may be generated from a Fresnel reflection at AR layer 217 where the third ghost image propagates along an optical path (starting as light 261) encountering layer 211, QWP 215, AR 217, polarizer 243 (reflecting), QWP 215, layer 211 (reflecting), QWP 215, AR 217 (reflecting), QWP 215, layer 211, QWP 215, polarizer 243 (reflecting), QWP 215, layer 211 (reflecting), QWP 215, and transmitting through polarizer 243 toward an eyebox area.

A fourth ghost image may be generated from a Fresnel reflection at AR layer 241 where the fourth ghost image propagates along an optical path (starting as light 261) encountering layer 211, QWP 215, AR 217, polarizer 243 (reflecting), QWP 215, layer 211 (reflecting), QWP 215, AR 241 (reflecting), QWP 215, layer 211, QWP 215, polarizer 243 (reflecting), QWP 215, layer 211 (reflecting), QWP 215, and transmitting through polarizer 243 toward an eyebox area.

Although, some ghost images may be generated by lens assembly 201, the magnitude of any ghost images may be less than half of prior lens assemblies that have six or more ghost reflection sites. By including QWP 215 in first optical element 210 rather than second optical element 240, the ghost reflection sites may be reduced and consequently reduce the magnitude of ghost images generated by the lens assembly.

Figure 3:
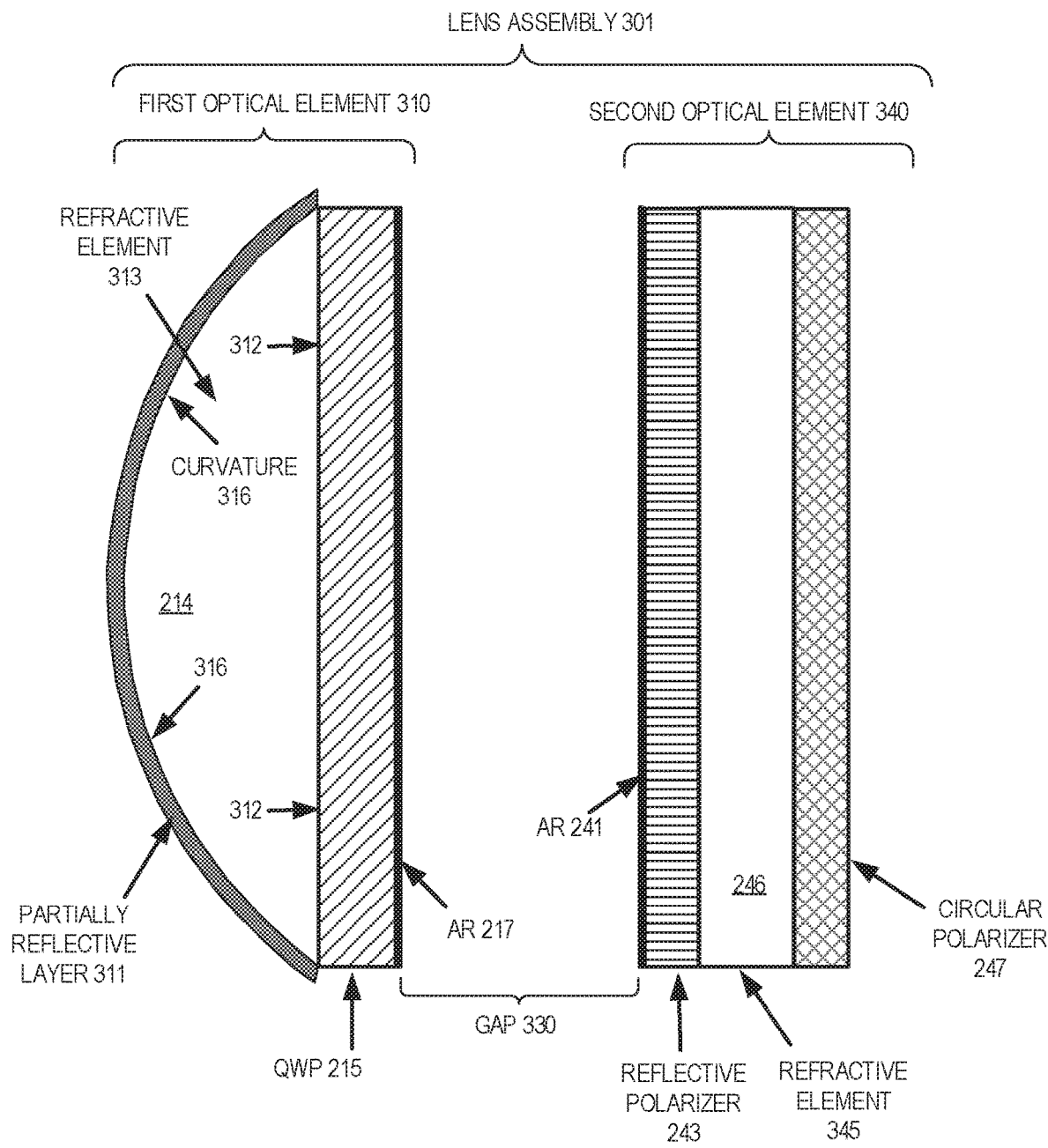
FIG. 3 illustrates an example lens assembly including a first optical element having a waveplate and a second optical element, in accordance with an embodiment of the disclosure.

FIG. 3 illustrates an example lens assembly 301 that may be used as lens assembly 101, in accordance with an embodiment of the disclosure. Lens assembly 301 include first optical element 310 and second optical element 340. In FIG. 3, refractive element 313 includes a lensing curvature 316. Lensing curvature 316 may be spherical. In some embodiments, lensing curvature 316 may be a rotationally symmetric sphere, a freeform shape, or other shape that mitigates field curvature. Partially reflective layer 311 is disposed on lensing curvature 316 so that the lensing curvature 316 provides optical power to display light that is reflected by partially reflective layer 311. For example, display light reflected by reflective polarizer 243 may become incident on partially reflective layer 311 as circularly polarized light (similar to light 264 in FIG. 2) and the lensing curvature 316 of refractive element 313 that partially reflective layer 311 is disposed on assists in focusing the display light for viewing by a wearer of an HMD. Partially reflective layer 311 may have similar characteristics as partially reflective layer 211.

FIG. 3 also illustrates that refractive element 313 includes a planar (flat) side 312 that is opposite the lensing curvature 316. In the illustrated embodiment, QWP 215 is laminated to the planar side 312 of refractive element 313 with an index matching material matched to refractive material 214.

In the illustrated example of FIG. 3, reflective polarizer 243 is coupled to a flat surface of refractive element 345. In other embodiments of second optical element 340 (not illustrated), refractive element 345 may include a lensing curvature that reflective polarizer 243 is laminated to.

Figure 4:
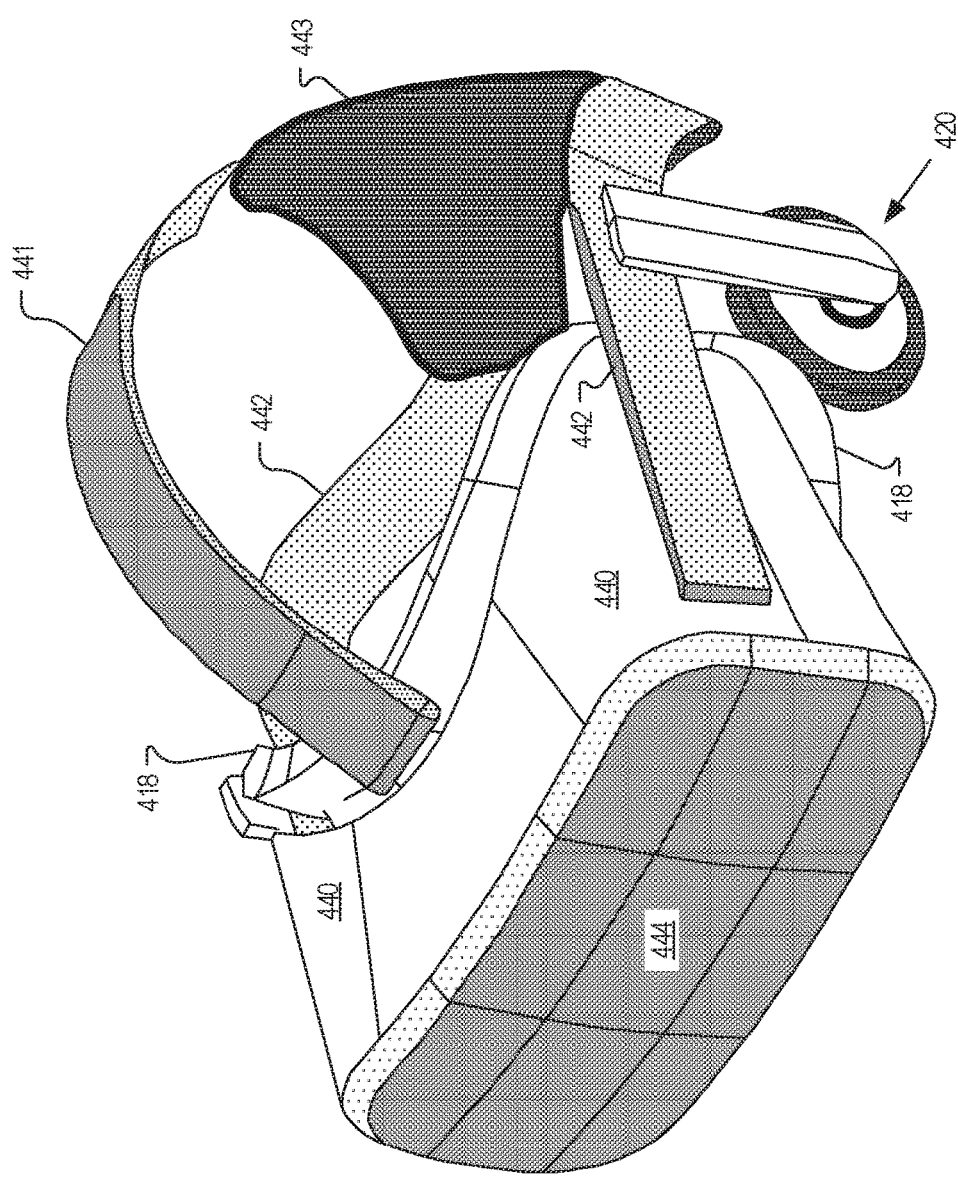
FIG. 4 illustrates an example head mounted display (HMD) that may include optical assemblies of the disclosure, in accordance with an embodiment of the disclosure.

FIG. 4 illustrates an example head mounted display (HMD) 400 that may include system 100 and/or or a lens assembly 101/201/301, in accordance with an embodiment of the disclosure. Example head mounted display (HMD) 400 includes a top structure 441, a rear securing structure 443, and a side structure 442 attached with a viewing structure 440 having a front rigid body 444. The illustrated HMD 400 is configured to be worn on a head of a user of the HMD. In one embodiment, top structure 441 includes a fabric strap that may include elastic. Side structure 442 and rear securing structure 443 may include a fabric as well as rigid structures (e.g. plastics) for securing the HMD to the head of the user. HMD 400 may optionally include earpiece(s) 420 configured to deliver audio to the ear(s) of a wearer of HMD 400.

In the illustrated embodiment, viewing structure 440 includes an interface membrane 418 for contacting a face of a wearer of HMD 400. Interface membrane 418 may function to block out some or all ambient light from reaching the eyes of the wearer of HMD 400.

Example HMD 400 also includes a chassis for supporting hardware of the viewing structure 440 of HMD 400. Hardware of viewing structure 440 may include any of processing logic, wired and/or wireless data interface for sending and receiving data, graphic processors, and one or more memories for storing data and computer-executable instructions. In one embodiment, viewing structure 440 may be configured to receive wired power. In one embodiment, viewing structure 440 is configured to be powered by one or more batteries. In one embodiment, viewing structure 440 may be configured to receive wired data including video data. In one embodiment, viewing structure 440 is configured to receive wireless data including video data.

Viewing structure 440 may include a display for directing image light to a wearer of HMD 400. The display may include an LCD, an organic light emitting diode (OLED) display, micro-LED display, quantum dot display, pico-projector, or liquid crystal on silicon (LCOS) display for directing image light to a wearer of HMD 400.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
   a first optical element comprising:
      a partially reflective layer;
      a waveplate; and
      a first refractive element disposed between the partially reflective layer and the waveplate; and
   a second optical element spaced a distance from the first optical element, the second optical element comprising:
      a second refractive element; and
      a reflective polarizer layer disposed on the second refractive element,
   wherein the reflective polarizer layer is configured to reflect a first polarization orientation of display light received from the first optical element and transmit a second polarization orientation of the display light orthogonal to the first polarization orientation.

2. The lens assembly of claim 1, wherein the first refractive element includes a lensing curvature having optical power, and wherein the partially reflective layer is disposed on the lensing curvature.

3. The lens assembly of claim 2, wherein the waveplate is laminated to a planar surface of the first refractive element that is opposite the lensing curvature of the first refractive element.

4. The lens assembly of claim 3, wherein the waveplate is laminated to the planar surface with an index matching material matched to a refractive material of the first refractive element.

5. The lens assembly of claim 1, wherein the waveplate is a quarter waveplate.

6. The lens assembly of claim 1, wherein the first optical element includes a first anti-reflective (AR) layer disposed on the waveplate, the waveplate disposed between the first AR layer and the first refractive element,
   and wherein the second optical element includes a second AR layer disposed on the reflective polarizer layer.

7. The lens assembly of claim 6, wherein the partially reflective layer is disposed on the first refractive element, and wherein the waveplate is laminated to the first refractive element.

8. The lens assembly of claim 1, wherein the reflective polarizer layer is disposed on a planar surface of the second refractive element.

9. The lens assembly of claim 1, wherein the second optical element includes a circular polarizer, and wherein the second refractive element is disposed between the circular polarizer and the reflective polarizer layer.

10. The lens assembly of claim 1 further comprising:
    a circular polarizer, wherein the first optical element is disposed between the circular polarizer and the second optical element.

11. The lens assembly of claim 1 further comprising:
    a second waveplate, wherein the first optical element is disposed between the second waveplate and the second optical element.

12. The lens assembly of claim 1, wherein the partially reflective layer is configured to transmit approximately 50% of the display light and reflect approximately 50% of the display light.

13. A head mounted display (HMD) comprising:
    a display configured to emit display light;
    a first optical element comprising:
       a partially reflective layer disposed to receive the display light;
       a waveplate; and
       a first refractive element disposed between the partially reflective layer and the waveplate; and
    a second optical element spaced a distance from the first optical element, the second optical element comprising:
       a second refractive element; and
       a reflective polarizer layer disposed on the second refractive element,
    wherein the reflective polarizer layer is configured to reflect a first polarization orientation of display light and transmit a second polarization orientation of the display light different from the first polarization orientation.

14. The HMD of claim 13, wherein the first refractive element includes a lensing curvature having optical power, and wherein the partially reflective layer is disposed on the lensing curvature.

15. The HMD of claim 14, wherein the waveplate is laminated to a planar side of the first refractive element that is opposite the lensing curvature of the first refractive element.

16. The HMD of claim 13, wherein the waveplate is a quarter waveplate.

17. The HMD of claim 13, wherein the first optical element includes a first anti-reflective (AR) layer disposed on the waveplate, the waveplate disposed between the first AR layer and the first refractive element,
    and wherein the second optical element includes a second AR layer disposed between the reflective polarizer layer and the first AR layer.

18. The HMD of claim 13, wherein the reflective polarizer layer is disposed on a planar surface of the second refractive element.

19. The HMD of claim 13, wherein the second optical element includes a circular polarizer, and wherein the second refractive element is disposed between the circular polarizer and the reflective polarizer layer.

20. A lens assembly comprising:
    a first optical element configured to receive circularly polarized display light and transmit a portion of the circularly polarized display light as linearly polarized display light; and
    a second optical element configured to receive the linearly polarized display light from the first optical element and reflect the linearly polarized display light back to the first optical element as reflected linearly polarized display light having a first polarization orientation,
    wherein the first optical element is further configured to receive the reflected linearly polarized display light and direct the reflected linearly polarized display light back to the second optical element as orthogonal linearly polarized display light having a second polarization orientation orthogonal to the first polarization orientation, and wherein the second optical element is configured to receive the orthogonal linearly polarized display light and generate circularly polarized display light for directing to an eyebox area.

* * * * *